US011969982B2

(12) United States Patent
Cleckner et al.

(10) Patent No.: US 11,969,982 B2
(45) Date of Patent: Apr. 30, 2024

(54) COSMETICALLY ALTERED FIBERGLASS PIECE

(71) Applicant: Live Watersports, LLC, Clearwater, FL (US)

(72) Inventors: John D. Cleckner, Madeira Beach, FL (US); Tim A. Weinberger, Largo, FL (US); Gregory Richard Cody, Clearwater, FL (US)

(73) Assignee: Live Watersports, LLC, Clearwater, FL (US)

( * ) Notice: Subject to any disclaimer, the term of this patent is extended or adjusted under 35 U.S.C. 154(b) by 0 days.

(21) Appl. No.: 18/112,841

(22) Filed: Feb. 22, 2023

(65) Prior Publication Data

US 2023/0264436 A1 Aug. 24, 2023

Related U.S. Application Data

(60) Provisional application No. 63/312,571, filed on Feb. 22, 2022.

(51) Int. Cl.
*B32B 38/18* (2006.01)
*B29C 70/08* (2006.01)
(Continued)

(52) U.S. Cl.
CPC ........ *B32B 38/1808* (2013.01); *B29C 70/081* (2013.01); *B29C 70/18* (2013.01); *B29C 70/22* (2013.01); *B29C 70/48* (2013.01); *B29C 70/54* (2013.01); *B32B 7/12* (2013.01); *B32B 37/1284* (2013.01); *B32B 38/0012* (2013.01); *B29K 2105/0845* (2013.01); *B29K 2105/128* (2013.01); *B29K 2309/08* (2013.01); *B29K 2311/00* (2013.01); *B29K 2313/02* (2013.01); *B32B 2038/0028* (2013.01); *B32B 2038/0076* (2013.01); *B32B 2250/02* (2013.01); *B32B 2305/18* (2013.01); *B32B 2307/414* (2013.01)

(58) Field of Classification Search
CPC ........ E04F 15/10; B29C 70/48; B29C 70/081; B29C 70/18; B29C 70/22; B29C 70/54; B29K 2105/0845; B29K 2105/128; B29K 2309/08; B29K 2311/00; B29K 2313/02
USPC .............................. 442/181; 428/15; 156/99
See application file for complete search history.

(56) References Cited

U.S. PATENT DOCUMENTS

2010/0284080 A1 11/2010 Mullen
2011/0229663 A1 9/2011 Villarreal, Jr.
(Continued)

FOREIGN PATENT DOCUMENTS

KR 2011-0090189 A 8/2011

OTHER PUBLICATIONS

International Search Report and Written Opinion for International Appl. No. PCT/US23/13622, dated Apr. 26, 2023.
(Continued)

*Primary Examiner* — Camie S Thompson
(74) *Attorney, Agent, or Firm* — Stephen E. Kelly; Hill Ward Henderson, P.A.

(57) ABSTRACT

A cosmetically altered fiberglass piece having an outer layer of curable gel-coat, an intermediate layer of textile fabric having a graphical element depicted thereon, and an inner layer of composite. A resin or epoxy is used to bond the layers to form the cosmetically altered fiberglass piece. Introduction of resin or epoxy is performed through one of a manual application, a vacuum infusion, or light RTM.

18 Claims, 2 Drawing Sheets

(51) Int. Cl.
  *B29C 70/18*   (2006.01)
  *B29C 70/22*   (2006.01)
  *B29C 70/48*   (2006.01)
  *B29C 70/54*   (2006.01)
  *B29K 105/08*  (2006.01)
  *B29K 105/12*  (2006.01)
  *B29K 309/08*  (2006.01)
  *B29K 311/00*  (2006.01)
  *B32B 7/12*    (2006.01)
  *B32B 37/12*   (2006.01)
  *B32B 38/00*   (2006.01)

(56) References Cited

U.S. PATENT DOCUMENTS

| | | |
|---|---|---|
| 2015/0004863 A1 | 1/2015  | Masini |
| 2016/0368276 A1 | 12/2016 | Potter |
| 2021/0001575 A1 | 1/2021  | Altan et al. |

OTHER PUBLICATIONS

U.S. Appl. No. 18/112,857, filed Feb. 22, 2023, Cleckner, John D. et al.
United States Patent and Trademark Office, Office Action for U.S. Appl. No. 18/112,857, Dated Feb. 15, 2024.

COSMETICALLY ALTERED FIBERGLASS PIECE

CROSS-REFERENCE TO RELATED APPLICATION

Pursuant to 35 U.S.C. § 119(e), this application claims the benefit of U.S. Provisional Patent Application Ser. No. 63/312,571, filed on Feb. 22, 2022, the entire contents of which are incorporated herein by this reference.

BACKGROUND

(1) Field of Endeavor

The present invention relates generally to the decoration of or printing on fiberglass pieces, and more particularly, to a cosmetically altered fiberglass pieces and related methods.

(2) Description of Related Art

In the fiberglass industry, there are five main methods for adding cosmetics to a fiberglass pieces, such as fiberglass parts or panels: (1) Pre-process painting, which incorporates spraying gel-coat in a fiberglass mold, where the gel-coat becomes part of the fiberglass piece; (2) post-process painting, which incorporates spraying gel-coat or paint after the fiberglass piece has cured and been removed from its mold; (3) hydro-dipping which incorporates dipping finished fiberglass pieces in a liquid containing inks and a pattern; (4) vinyl wrapping, which incorporates placing a vinyl lining onto a finished fiberglass piece; and (5) clear painting with two layers of composite with one of those layers (veil) containing graphics. The present method seeks to add a sixth alternative, which incorporates pre- or post-process clear painting and the use of printed on textiles/fabrics. These textiles can be cotton, polyester, elastane, hemp, nylon, wool, linen, or blends like cotton-polyester or polyester-elastane.

DESCRIPTION OF THE PREFERRED EMBODIMENT

With reference to the drawings, the cosmetically altered fiberglass will now be described with regard for the best mode and the preferred embodiment. In general, the device is a portion of fiberglass that is cosmetically altered using a textile fabric. The embodiments disclosed herein are meant for illustration and not limitation of the invention. An ordinary practitioner will appreciate that it is possible to create variations of the following embodiments without undue experimentation.

Figure 1:
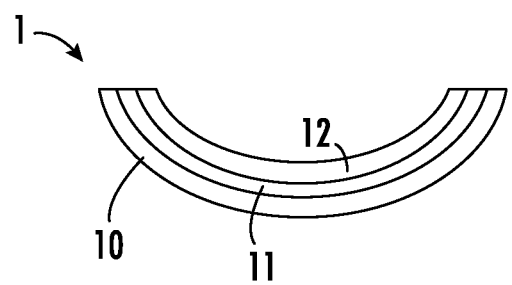
FIG. 1 is a cross sectional view of a representative fiberglass piece according to one embodiment of the present device and method.
Figure 2:
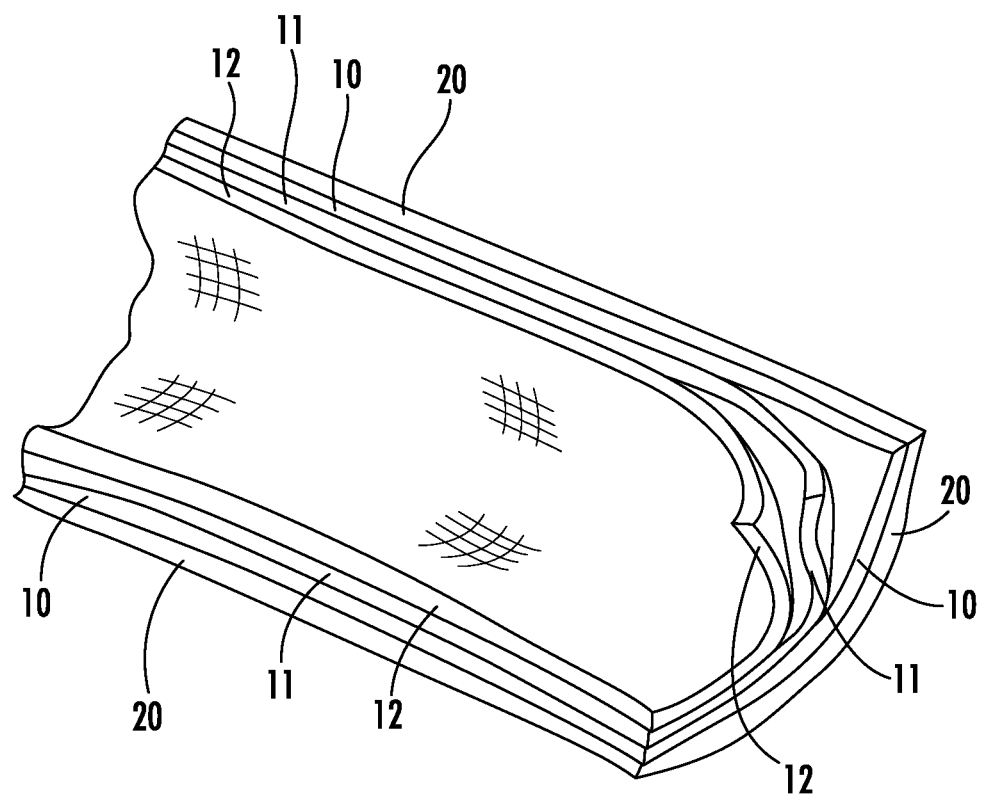
FIG. 2 shows an outer layer, an intermediate layer, and an inner layer according to one embodiment of the present cosmetically altered fiberglass piece.

Referring to FIGS. 1 and 2, the device is a cosmetically altered fiberglass piece 1, such as a part, panel, fascia, hull, shell, container, or any other object that can be constructed from fiberglass. The cosmetically altered fiberglass piece 1 comprises one or more outer layers 10, inner layers 12, and intermediate layers 11. Generally, an inner layer 12 is structural in nature, as described below. The intermediate layer(s) 11 comprises a textile (fabric) capable of displaying a graphical element 15. Such graphical elements 15 could be logos, animated characters, icons, artwork, patterns such as camouflage or other designs, photographs, renderings, or any other graphical display or design that is capable of being applied to a fabric or textile. The graphical element 15 can be applied to the textile fabric by any suitable method, such as by block, roller, screen, and heat transfer printing, by painting, by applying an adhesive patch or panel, by weaving decorative patterns into the textile fabric, or by other suitable methods.

In one embodiment, an outer layer 10 is a clear coating that forms a see-though, protective coating over an intermediate layer 11. In this embodiment, clear means that the coating is substantially free of tint, hues, or other coloration. In another embodiment, an outer layer 10 exhibits at least translucent properties so that onlookers of the final fiberglass piece 1 can see the graphical element 15. Such a translucent outer layer 10 may be tinted or exhibit various hues, colorcasts, sheens, or other coloration to onlookers. As described below, the three layers 10, 11, 12 are combined and cured to define the cosmetically altered fiberglass piece 1. The cosmetically altered fiberglass piece 1 can take a wide variety of configurations, such as a flat or curved panel, or any other shape achievable by fiberglass.

Each outer layer 10 is a protective coat, such as paint or a curable gel-coat. The inner layer 12 is a layer of composite applied appropriately within a fiberglass mold 20. The inner layer 12 can include one or more of fiberglass roll, fiberglass chop, carbon, Kevlar, or aramids. A combination weave of one or more of fiberglass, carbon, Kevlar, and/or aramids could also be used for the inner layer 12. The one or more intermediate layers 11 comprises a layer of textile fabric applied within the mold 20. Suitable textile fabrics include one or more of cotton, wool, linen, silk, fleece, vinyl, hemp, polypropylene (PP), polyester (PET), nylon (PA), viscose fiber, acrylic fiber, polyethene fiber (HDPE), chlorine fibre (PVC), elastane, cotton-polyester blends, polyester-elastane blends, cotton-polyester-elastane blends, or other similar knit, woven, or non-woven fabrics, materials, and blends of natural or synthetic fibers.

In one embodiment of the method of making the cosmetically altered fiberglass piece 1, an outer layer 10 of gel-coat is added either in mold 20 (pre-process) or out of mold 20 (post-process). The method incorporates either a pre-process application (in mold 20) with a clear or translucent gel-coat as the outer layer 10, or a post-process application with a clear or translucent gel-coat or paint as the outer layer 10. The pre-process application is accomplished manually using any gel-coat spray system (such as airless spray guns, gravity fed spray guns, or siphon type spray guns), or through a robotic paint machine (such as a FANUC painting robot). Either method includes attaching a reservoir of gel-coat along with an appropriate amount of catalyst to the gel-coat spray system, where the catalyst is mixed with the gel-coat to provide a curable gel-coat spray. The type of catalyst may vary depending up the type of gel-coat. This combination of catalyst and gel-coat is sprayed into the mold 20 to coat all appropriate areas of the mold 20 intended for a pre-determined color and/or clarity of gel-coat. Either alternative might require a number of passes to ensure that the desired thickness of gel-coat is achieved to ensure a correctly finished cosmetically altered fiberglass piece 1.

In one embodiment of the pre-process method, after application of the outer layer 10 to the inner surface of the mold 20, the next step is installation of at least one intermediate layer 11 of textile fabric, which is applied appropriately within the mold 20, which may be a multi-section mold 20. In one embodiment, the intermediate layer 11 is cut to fit the mold 20 dimensions and then placed over the mold 20 in a desired orientation. The intermediate layer 11, with the graphical element 15 facing the outer layer 10 (adjacent to the outer layer 10) so that the graphical element 15 is visible once the fiberglass piece 1 has cured and has been demolded. The intermediate layer 11 is then stretched and/or pressed down into the mold 20 section by section against the mold 20 until the intermediate layer 11 is disposed substantially flat against the outer layer 10. In another embodiment, the intermediate layer 11 is placed into the mold 20 via a light resin transfer molding ("RTM") male mold where the intermediate layer 11 is pushed into place in the female mold 20 part by the male mold 20. In either embodiment, it is preferable that the intermediate layer 11 fabric design and shape is aligned and matched appropriately with the mold 20 design to ensure that the graphical element 15 appears in the desired orientation and direction without any distortion of the intermediate layer 11 or of the graphical element 15. In many applications, the intermediate layer 11 is disposed such that no folds or creases occur in the intermediate layer 11.

In the next step, one or more inner layer(s) 12 of composite is applied within the mold 20. In other words, once the intermediate layer 11 is fully applied to the desired areas of the mold 20, it is then backed with one or more inner layers 12 of one or more of the materials or composites listed above. The inner layer(s) 12 of composite are applied into the mold 20 in a similar manner as the intermediate layer 11 fabric, where the inner layer 12 composite could be applied manually, or by pushing or pressing into place by a male mold. Alternatively, the inner layer 12 could be applied by via fiberglass chop gun where strands of fiberglass are sprayed into the mold 20 over the intermediate layer 11, thereby creating an inner layer 12 of composite material behind the intermediate layer 11. Multiple inner layers 12 of composite may be required to achieve the desired thickness, durability, and stiffness of the cosmetically altered fiberglass piece 1. The inner layer 12 composite is placed into the mold 20 in alignment with the mold 20 design and without shifting or moving the already applied intermediate layer 11 of textile (fabric).

Once the layers 10, 11, 12 are placed in the mold 20 as described above, a bonding agent, such as a resin or an epoxy, is used to bond the layers 10, 11, 12 to form the cosmetically altered fiberglass piece 1. In one embodiment, introduction of the bonding agent in the form of a resin (vinylester, polyester, urethane, polyurethane, vinylester blend) or epoxy is performed through one of manual application, vacuum infusion, or light RTM.

In an exemplary embodiment of the manual process, resin is poured in small sections over the outer layer 10 of gel-coat, intermediate layer 11 of fabric, and inner layer 12 of composite, and then the resin is manually rolled into the layers 10, 11, 12 by a resin roller until the initial amount of resin has been absorbed (wet out) by the layers 10, 11, 12 over a certain area of the layers 10, 11, 12. This process applying the bonding agent is repeated until the whole set up of the layers 10, 11, 12 are completely wet out with resin, thereby resulting in an assembly of a wet out three-layer combination. The wet out three-layer combination is then permitted to cure, resulting in the cured cosmetically altered fiberglass piece 1.

In an embodiment of the vacuum infusion process, the layers 10, 11, 12 of gel-coat, fabric, and composite, respectively, are covered by a vacuum bag that is appropriately sealed with vacuum tape. The whole set up is connected to both a reservoir of bonding agent and to a vacuum system. Substantially all air is evacuated by the vacuum system from the complete set up that is enveloped by the vacuum bag until near full vacuum is achieved (@30 in of Hg). Once a sufficient level of vacuum is achieved, the bonding agent reservoir is opened and the bonding agent is introduced into the complete set up until the entire area of gel-coat/fabric/composite layers 10, 11, 12 is fully wet out with bonding agent. The vacuum should be maintained on the fiberglass piece 1 until the proper cure time of the bonding agent is achieved. This cure time will vary depending on the type of bonding agent used. Generally, the vacuum is maintained until peak exothermic temperature has been achieved and the temperature is on the downslope of its temperature curve.

In an embodiment of the light RTM process, the layers 10, 11, 12 of gel-coat, fabric, and composite are manually pushed into place as desired, and then they are finally compressed by a male mold that is mated to a corresponding female mold 20. Once the male mold 20 has been pushed fully into place, the two molds are sealed. Bonding agent is introduced into this sealed system either by pulling vacuum on the sealed molds and pulling bonding agent into the arrangement of layers 10, 11, 12, or by pushing bonding agent into the mold via an appropriate bonding agent system. Either process requires the appropriate amount of bonding agent used to fully wet out the layers 10, 11, 12. Similar to the vacuum infusion process, this seal should remain in place until peak exothermic temperature of the bonding agent has been achieved, and the temperature is on the downslope of its temperature curve.

Once the bonding agent has cured, the cosmetically altered fiberglass piece 1 can be demolded. If pre-process painting was done in the mold 20, a complete product of three layers 10, 11, 12 (gel-coat, textile fabric, and composite layer, respectively) is complete. If preferable, as described earlier, the outside gel-coat/paint outer layer 10 can be added post-process to achieve completion of the three layers 10, 11, 12. The post-process application alternative is accomplished in a similar manner, using either a manual gel-coat/paint spray system or a robotic paint machine. In the post-process application, the process begins with application of at least one intermediate layer 11 of textile to a mold 20 for the fiberglass piece 1, the mold 20 having an inner surface and the textile comprising a graphical element 15 disposed against the inner surface. Next, the graphical element 15 is aligned to a desired orientation in relation to the mold 20. Then, an inner layer 12 is applied to the intermediate layer 11, the inner layer 12 comprising at least one of fiberglass roll, fiberglass chop, carbon, Kevlar, or aramids, as described above. Then a bonding agent is applied, as described below, to wet out the intermediate layer 11 and the inner layer 12, thereby resulting in an assembly of a wet out two-layer combination. The two-layer combination is then cured and demolded. Finally, an outer layer 10 of a curable gel-coat is applied to the cured two-layer combination, thereby resulting in the cosmetically altered fiberglass piece 1. The post-process application of the outer layer 10 may include the extra steps of sanding the whole de-molded cured two-layer piece on the appropriate side and adding a gel-coat/paint primer before applying the final coat of gel-coat or paint.

Figure 3:
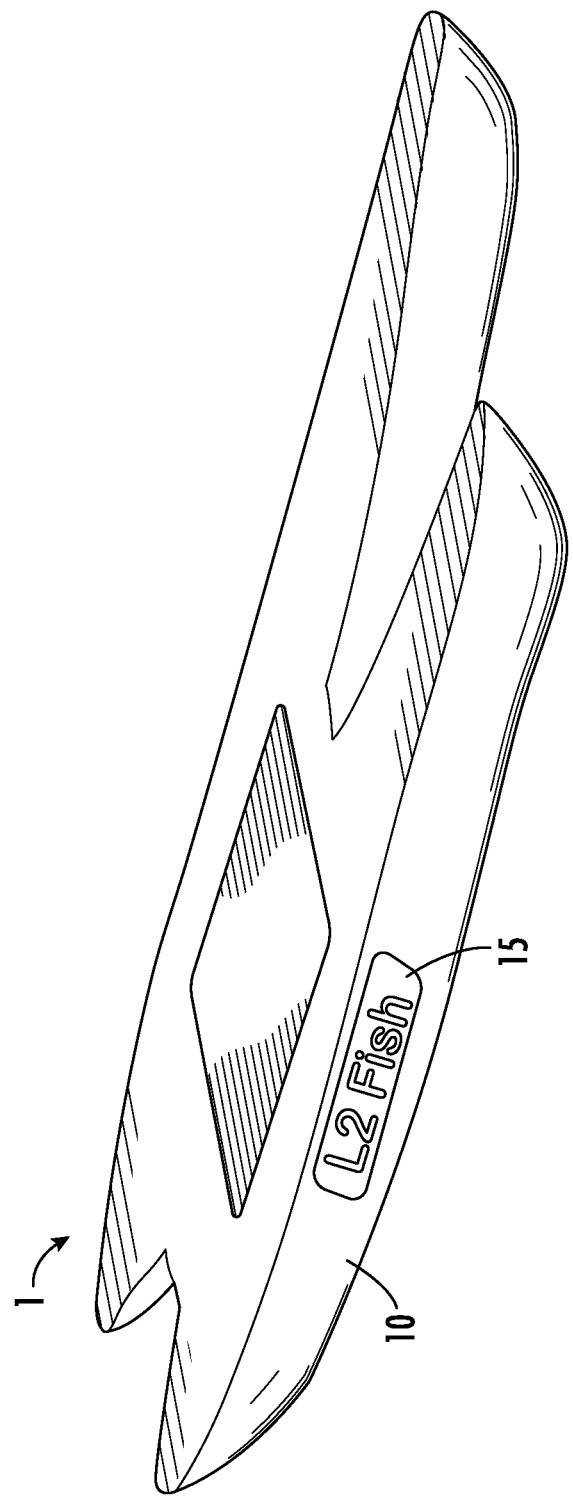
FIG. 3 shows a finished product using one embodiment of the present cosmetically altered fiberglass piece.

The embodiments described above can be used to produce any composite part of cosmetically altered fiberglass. Examples of products that can be made with this process includes boat framework and parts (deck, hatches, center console, tables, etc. . . . ), paddle boards (see FIG. 3), jet ski parts, waterpark slides, table tops, bar tops, automobile exterior or interior panels, statues or public artwork structures, fiberglass pools, coolers, storage containers, theme park rides, aeronautical parts/panels, or a variety of other parts and components for automotive, aerial, nautical, recreational, and other vehicles, products, and components.

The foregoing embodiments are merely representative of the cosmetically altered fiberglass piece 1 and not meant for limitation of the invention. For example, persons skilled in the art would readily appreciate that there are several embodiments and configurations of fabrics, epoxies, and resins that will not substantially alter the nature of the cosmetically altered fiberglass piece 1. Likewise, elements and features of the disclosed embodiments could be substituted or interchanged with elements and features of other embodiments, as will be appreciated by an ordinary practitioner. Consequently, it is understood that equivalents and substitutions for certain elements and components set forth above are part of the invention described herein, and the true scope of the invention is set forth in the claims below.

We claim:

1. A three-layer combination of a cosmetically altered fiberglass piece comprising:
   an outer layer having a curable gel-coat;
   an inner layer comprising fiberglass configured for structural support of the fiberglass piece; and
   an intermediate layer disposed immediately adjacent to the outer layer on an outer side of the intermediate layer and immediately adjacent to the inner layer on an inner side of the intermediate layer, the intermediate layer comprising a textile fabric having a graphical element disposed immediately adjacent to the outer layer in a manner viewable through the outer layer.

2. The cosmetically altered fiberglass piece of claim 1, wherein the intermediate layer textile comprises a woven fabric.

3. The cosmetically altered fiberglass piece of claim 2, wherein the woven fabric comprises synthetic fibers.

4. The cosmetically altered fiberglass piece of claim 2, wherein the woven fabric comprises natural fibers.

5. The cosmetically altered fiberglass piece of claim 2, wherein the woven fabric comprises a blend of natural fibers and synthetic fibers.

6. The cosmetically altered fiberglass piece of claim 1, wherein the intermediate layer textile comprises a non-woven fabric.

7. The cosmetically altered fiberglass piece of claim 6, wherein the non-woven fabric comprises natural fibers.

8. The cosmetically altered fiberglass piece of claim 6, wherein the non-woven fabric comprises synthetic fibers.

9. The cosmetically altered fiberglass piece of claim 6, wherein the non-woven fabric comprises a blend of natural and synthetic fibers.

10. The cosmetically altered fiberglass piece of claim 1, wherein the inner layer comprises a material selected from the group consisting of fiberglass roll, fiberglass chop, carbon, and aramids.

11. The cosmetically altered fiberglass piece of claim 10, wherein the intermediate layer textile comprises a woven fabric.

12. The cosmetically altered fiberglass piece of claim 11, wherein the woven fabric comprises synthetic fibers.

13. The cosmetically altered fiberglass piece of claim 1, wherein the woven fabric comprises natural fibers.

14. The cosmetically altered fiberglass piece of claim 11, wherein the woven fabric comprises a blend of natural fibers and synthetic fibers.

15. The cosmetically altered fiberglass piece of claim 10, wherein the intermediate layer textile comprises a non-woven fabric.

16. The cosmetically altered fiberglass piece of claim 15, wherein the non-woven fabric comprises natural fibers.

17. The cosmetically altered fiberglass piece of claim 15, wherein the non-woven fabric comprises synthetic fibers.

18. The cosmetically altered fiberglass piece of claim 15, wherein the non-woven fabric comprises a blend of natural and synthetic fibers.

* * * * *